(12) United States Patent
Paatero et al.

(10) Patent No.: US 7,093,198 B1
(45) Date of Patent: Aug. 15, 2006

(54) SKINS FOR MOBILE COMMUNICATION DEVICES

(75) Inventors: Lauri Paatero, Helsinki (FI); Christian Lindholm, Helsinki (FI)

(73) Assignee: Nokia Corporation, Espoo (FI)

( * ) Notice: Subject to any disclaimer, the term of this patent is extended or adjusted under 35 U.S.C. 154(b) by 181 days.

(21) Appl. No.: 09/930,484

(22) Filed: Aug. 16, 2001

(51) Int. Cl.
*G06F 3/14* (2006.01)
*G06F 3/00* (2006.01)

(52) U.S. Cl. .................. 715/746; 715/762; 715/864

(58) Field of Classification Search ............. 345/762, 345/760, 864, 763, 967, 733, 744, 764, 778, 345/747; 715/513, 762, 864; 709/219, 328
See application file for complete search history.

(56) References Cited

U.S. PATENT DOCUMENTS

| | | | |
|---|---|---|---|
| 6,012,098 A * | 1/2000 | Bayeh et al. ............... | 709/246 |
| 6,023,714 A * | 2/2000 | Hill et al. ................... | 715/513 |
| 6,091,411 A * | 7/2000 | Straub et al. ............... | 345/747 |
| 6,101,511 A * | 8/2000 | DeRose et al. ............. | 715/514 |
| 6,130,933 A | 10/2000 | Miloslavsky | |
| 6,161,114 A | 12/2000 | King et al. | |
| 6,473,609 B1 | 10/2002 | Schwartz et al. | |
| 6,477,549 B1 | 11/2002 | Hishida et al. | |
| 6,507,857 B1 * | 1/2003 | Yalcinalp ................... | 715/513 |
| 6,582,778 B1 * | 6/2003 | Namiki et al. ............... | 427/575 |
| 6,636,175 B1 * | 10/2003 | Russell et al. ........... | 342/357.1 |
| 6,650,889 B1 * | 11/2003 | Evans et al. ................ | 455/418 |
| 6,718,182 B1 * | 4/2004 | Kung ....................... | 455/556.1 |

FOREIGN PATENT DOCUMENTS

| | | |
|---|---|---|
| CN | 1220427 A | 6/1999 |
| EP | 0715246 A1 * | 6/1996 |
| EP | 0908832 A2 | 4/1999 |
| EP | 1091540 | 4/2001 |

OTHER PUBLICATIONS

Topdesktop.com/skin1.htm, Feb. 27, 2001 (1 page).
Shopping.altavista.com (netscape skins), Feb. 27, 2001 (p. 1).
www.netscape.com/themes/, Feb. 27, 2001 (3 pages).
www.nokia.com/phones/3310/index,html, Feb. 27, 2001 (1 page).
www.nokia.com/phones/3310/index,html, Feb. 27, 2001 (p. 1).
www.intertrust.com/main/metatrust/whatsdrm.html, Feb. 27, 2001 (p. 1).
AAP Releases E-book Standards, Paul Hilts, Dec. 4, 2000 (2 pages).
Jan. 6, 2006, Office Action in corresponding Chinese application.

* cited by examiner

*Primary Examiner*—Kieu D. Vu
(74) *Attorney, Agent, or Firm*—Banner & Witcoff Ltd.

(57) ABSTRACT

A skin is provided for the user interface of a mobile communication device. The skin is obtained by providing a data file including information defining characteristics of the skin, providing a markup language style sheet describing a manner in which data is to be represented on a display of the mobile communication device; transforming the data file into a markup language document according to the markup language style sheet, and providing the markup language document to an user interface application to represent the data on the display.

65 Claims, 5 Drawing Sheets

SKINS FOR MOBILE COMMUNICATION DEVICES

BACKGROUND

1. Field of the Invention

The present invention relates generally to user interfaces in mobile communication devices. Particular aspects of the invention relate to methods of providing skins for the user interface of a mobile communication device.

2. Discussion of the Related Art

With some software written for desktop and laptop computers, various aspects and features of the user interface, such as graphical elements, icons, animations, colors, texture, fonts, sounds, etc., can be easily changed all at the same time. The changes can be accomplished using data files referred to as "skins", which can be easily downloaded from the Internet and installed without altering the functionality of the software. Skins are available for the Netscape 6 web browser at www.netscape.com, and for the Windows operating system software and various applications software at www.topdesktop.com. Most of the skins are available for free. Even for a skin that is only available for a fee, there is nothing to prevent the skin from being copied and forwarded or distributed to others without payment to the party originally providing the skin. This inhibits the development of an effective commercial market for skins.

The circumstances for customization or personalization are quite different in the field of mobile communications devices, such as cellular phones, personal digital assistants (PDAs), web pads, pagers, cordless telephones, handheld computers, etc. Customization of the user interface is limited to ringing tones, screen savers and simple logos, usually determined by a user profile maintained by the operator of the wireless communication network which the device accesses for communications, and/or exchangeable covers and keypads for the housing of the device such as described in EP 1091540.

Mobile communications devices have been growing rapidly in computing power and can now perform many functions in addition to voice telephony (such as a phonebook, personal organizer, etc). In particular, they are capable of requesting, receiving and displaying information consisting of alphanumeric text or graphics. An example of alphanumeric text is a short message service (SMS) in GSM, which permits the user to send and receive short text messages transmitted through a cellular public land mobile network (PLMN). More recently, mobile communications devices have been developed which allow the user to access documents or graphics data from the Internet or elsewhere using the Wireless Application Protocol (WAP) over wireless communication networks.

WAP enabled devices allow information to be accessed from various remote servers offering data services such as banking, stock quotes, and weather forecasts. Data content is provided in a markup language, such as wireless markup language (WML) or extensible hypertext markup language (XHTML). WML is configured to allow data to be displayed as a deck of individual cards which are of a size suited for display on the relatively small display screen typical. A micro-browser software application is typically provided in the mobile communication device to receive the data and display it in different screens. The user interface of the mobile communication device provides some way for the user to navigate between different display screens.

Since mobile communications devices typically use displays of relatively small size and/or resolution, the degree of user satisfaction depends greatly on the ability to display data in a manner preferred by the user. Since mobile communication devices are typically battery powered, they generally use black and white displays rather than color displays which consume more power. This creates also a disadvantage insofar as color cannot be used to enhance the user interface.

Because of the relatively fixed architecture of mobile communications devices, a user cannot install or change software and there are no skins or other possibilities for the user of a mobile communications device to alter the display of information as there are in the field of desktop or laptop computers. Customization of the user interface according to user preference is limited to ringing tones, screen savers, logos and the use of exchangeable covers for the housing of the device, such as described in EP 1091540.

BRIEF SUMMARY

The present invention addresses mobile communications devices, software applications and micro-browsers thereof which are disadvantageous for at least the reasons recognized above. There are several different aspects to the invention, some of which may be practiced without the others.

One aspect of the present invention is directed to a method of allowing graphical elements of a screen display of a mobile communication device to have animations, colors, texture and fonts changed in order to match them to current trends or to the color and texture of the phone. In particular, the invention is directed to a method of providing skins for mobile communication devices so that the graphical elements of the display can be changed as easily as they are in a desktop or laptop computer.

In another aspect of the invention, a copy protection scheme is provided for the skins of mobile communication devices. This enables an economically sustainable market for their creation and distribution and a payment system so that a user of a mobile communications device can easily arrange for payment when a new skin is installed on this device.

DETAILED DESCRIPTION

While the foregoing and following written and illustrated disclosure focuses on disclosing several embodiments, it should be clearly understood that the same is by way of illustration and example only and is not to be taken by way of limitation. The embodiments are described with respect to a cellular phone. However, they may be practiced with respect to any type of mobile communication device.

The phone preferably contains software including a set of software components that enables it to communicate with a wireless communication network, various software applications and a set of application programming interfaces (APIs) so that software components and applications can work together on the mobile device. In particular, the software includes a browser for the World Wide Web that enables it to render a display on a screen as described below. However, the invention however is not limited to such a set of software modules or APIS, to implementation in a particular wireless communication network or to particular specifications, such as Wireless Access Protocol (WAP).

Mobile Phone

Figure 1:
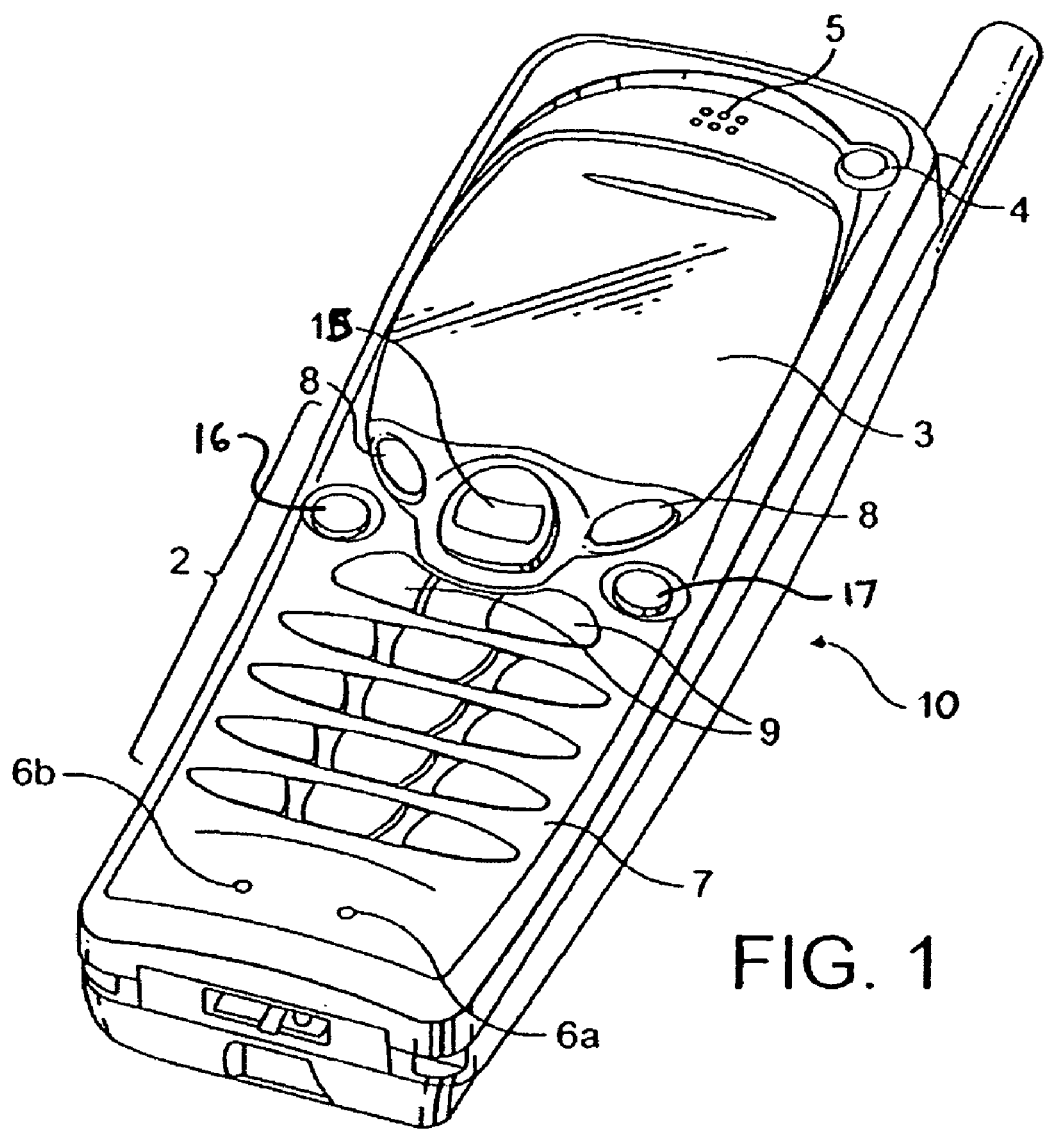
FIG. 1 is an illustration of an exemplary mobile phone to which an embodiment may be applied.

FIG. 1 shows an example of a mobile phone to which an embodiment may be applied. The phone, which is generally designated by 10, comprises a keypad 2, a liquid crystal display 3, an on/off button 4, a speaker 5 (only openings are shown in FIG. 1) and/or ear-piece (not shown), a microphone 6a (only the opening is shown in FIG. 1) and a transducer 6b. Liquid crystal display (LCD) 3 is preferably formed integrally within mobile phone 10. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a FIGS."0–9" or a sign "#" or "*", respectively. In alpha mode, each key is associated with a number of letters and special signs and can be used to select characters, for example, to produce and edit short SMS text messages. The selected key is pressed successively relatively quickly to change the character selected by the key between the characters marked on the key concerned, with each successive key operation. When the desired character is displayed, the user waits and a timeout occurs with the result that the displayed character becomes the selected character.

The keypad 2 additionally comprises two soft keys 8 adjacent the underside of LCD 3, two call handling keys 9, a navigation key 15 for navigating the cursor in display 3, a key 17 for switching between numbers and letters for the twelve alphanumeric keys in the first group 7 of keys, and a "clear key" 16 for clearing one or more letters from the display. The two soft keys 8 preferably comprise manually depressible buttons. Their functionality can be pre-programmed depending upon the task performed. The functionality of the two soft keys 8 depends on the state of the phone and navigation through display 3 using navigation key 15. The functionality attributed to the two soft keys 8 is displayed as soft key function legends in separate fields in the display 3 just above the respective soft keys 8. The two call handling keys 9 according to the preferred embodiment are used for establishing a call or a conference call, terminating a call or rejecting an incoming call.

The navigation key 15 is an up/down key placed centrally on the front surface of the phone between the display 3 and the group of alphanumeric keys 7. When pushed upwardly, it scrolls up. Conversely, when pushed downwardly, it scrolls down. In use, an active or focus region is provided on the display which, as explained in more detail later, can be modified. The focus region may be delineated by a rectangular box which is moved around the display. It can be provided in different ways, such as a region highlighted with a different intensity or color from the rest of the display, an underlining of a menu option or by means of a pointer movable across the display in the manner of a conventional mouse pointer. Hereby the user will be able to control this key by simply pressing the up/down key using their thumb. Since many experienced phone users are used to one-hand control, it is a very good solution to place an input key, requiring precise motor movements. Thus, the user may place the phone in the hand between the finger tips and the palm of the hand. Hereby, the thumb is free for inputting information.

Navigation key 15 may comprise a three-way roller which is manually depressible inwardly of the handset, in the direction of arrow 26, to perform a "select" function. Alternatively, it may be configured as a five-way roller (not shown) so as to perform additional right and left scrolling functions, a roller ball, a pivot device to scroll for LCD3, a touch pad or other navigation device of the type used in laptop computers.

Mobile Phone Hardware Architecture

Figure 2:
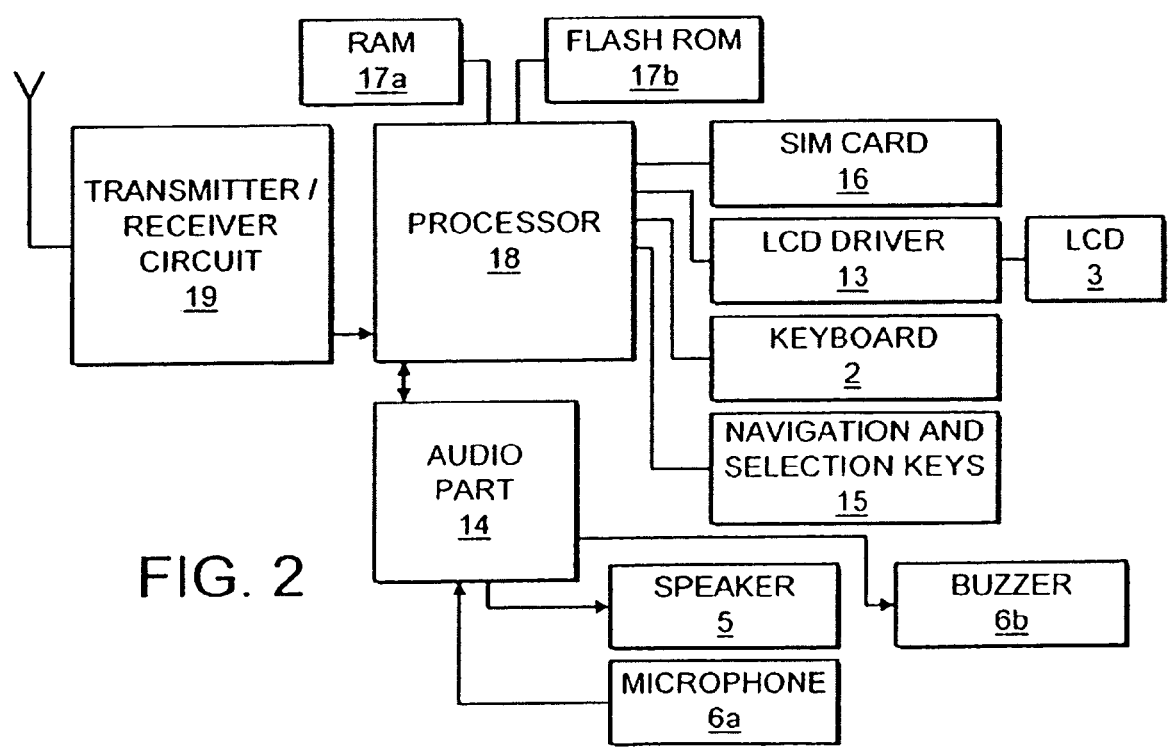
FIG. 2 is a diagram illustrating the major elements in an example of the hardware architecture of the mobile phone illustrated in FIG. 1.

FIG. 2 is a block diagram of the major parts of possible hardware architecture for mobile phone 10. It should be understood that FIG. 2 is an example and that mobile phone 10 invention is not limited to such a hardware architecture.

Mobile phone 10 has a transmitter/receiver circuit 19, which is preferably a standardized transceiver adapted to operate according to cellular standards, connected to a processor unit 18 and communicatively connecting it to a cellular communication network (not shown). The phone is preferably adapted for communication via a wireless communication network, e.g., a cellular network, but it may also be adapted for a cordless network. For example, it may be adapted for use in connection with a GSM network, CDMA network, TDMA network, or other kinds of cellular networks and various forms of cordless phone systems or in dual band phones or tri-mode phones accessing sets of these systems/networks. Although not shown in FIG. 2, mobile phone 10 may also have a standard infrared (ir) or Bluetooth wireless port enabling it to directly receive data from another device via a wireless connection.

Speech signals received through transmitter/receiver circuit 19 are A/D converted in an A/D converter (not shown), fed to audio part 14 (preferably a codec configured to process signals under the control of processor unit 18) and encoded so as to produce analog signals fed to speaker 5 (and/or an ear-piece) through an amplifier (not shown). Audio part 14 receives analog signals from microphone 6a, after being amplified by an amplifier (not shown) and A/D converted in an A/D converter (not shown), encodes and transfers the encoded signals to processor unit 18 for transmission through transmitter/receiver circuit 19. The audio part 14 also decodes the signal, which is transferred from the processor unit 18 to the earpiece 5 via a D/A converter and amplifier (not shown).

Audio part 14 is also able to give an output of a ring tone to the buzzer 6b. The ring tone can be stored in either of the memories 17a,b, and is recalled when the transmitter/receiver circuit 19 receives an incoming signal, by means of the processor unit 18. Thus, the ring tone is recalled from the memory, forwarded to audio part 14, and the ring tone is generated as an output from the buzzer 6b.

Processor unit 18 is connected to, and has an interface associated with, random access memory (RAM) 17a and to Flash ROM 17b. Other memory (including ROM) may also be provided, either separate from or integrated with RAM 17a. It is also connected to a power supply, such as a battery. Processor unit 18 also has an interface with a smart card, preferably SIM card 16 containing mobile subscriber identity and removably received in a SIM card holder (not shown), a display driver 13 connected to LCD 3, and keypad 2. It receives instruction signals from keypad 2 and soft keys 8 and controls LCD 3.

There may be an input/output (I/O) unit (not shown) configured for any or all of the parts connected to processor unit 18. During operation, the processor unit 18 monitors the activity in the phone and controls the display 3 in response thereto. Therefore, it is the processor unit 18 which detects the occurrence of a state change event and changes the state of the phone and thus the display text. A state change event can be caused by the user activating the keypad, including navigation key 15, and these types of events are called entry events or user events. However, the network communicating with the phone may also cause a state change event. This type of event and other events beyond the user's control are called non-user events. Non-user events comprise status change during call set-up, change in battery voltage, change in antenna conditions, message on reception of SMS, etc.

Mobile Phone Software Architecture

Processor unit 18 also supports software in the phone. A variety of software applications, including software modules, are stored in Flash ROM 17b (or other persistent storage of mobile phone 10, but are not shown in FIG. 2 for the sake of convenience. The software can be ported to and integrated into mobile phone 10 at or near the time of manufacture or by the operator of a wireless communication network having appropriate facilities, but the user does not necessarily have the same rights to install the software as the manufacturer or the operator.

Figure 3:
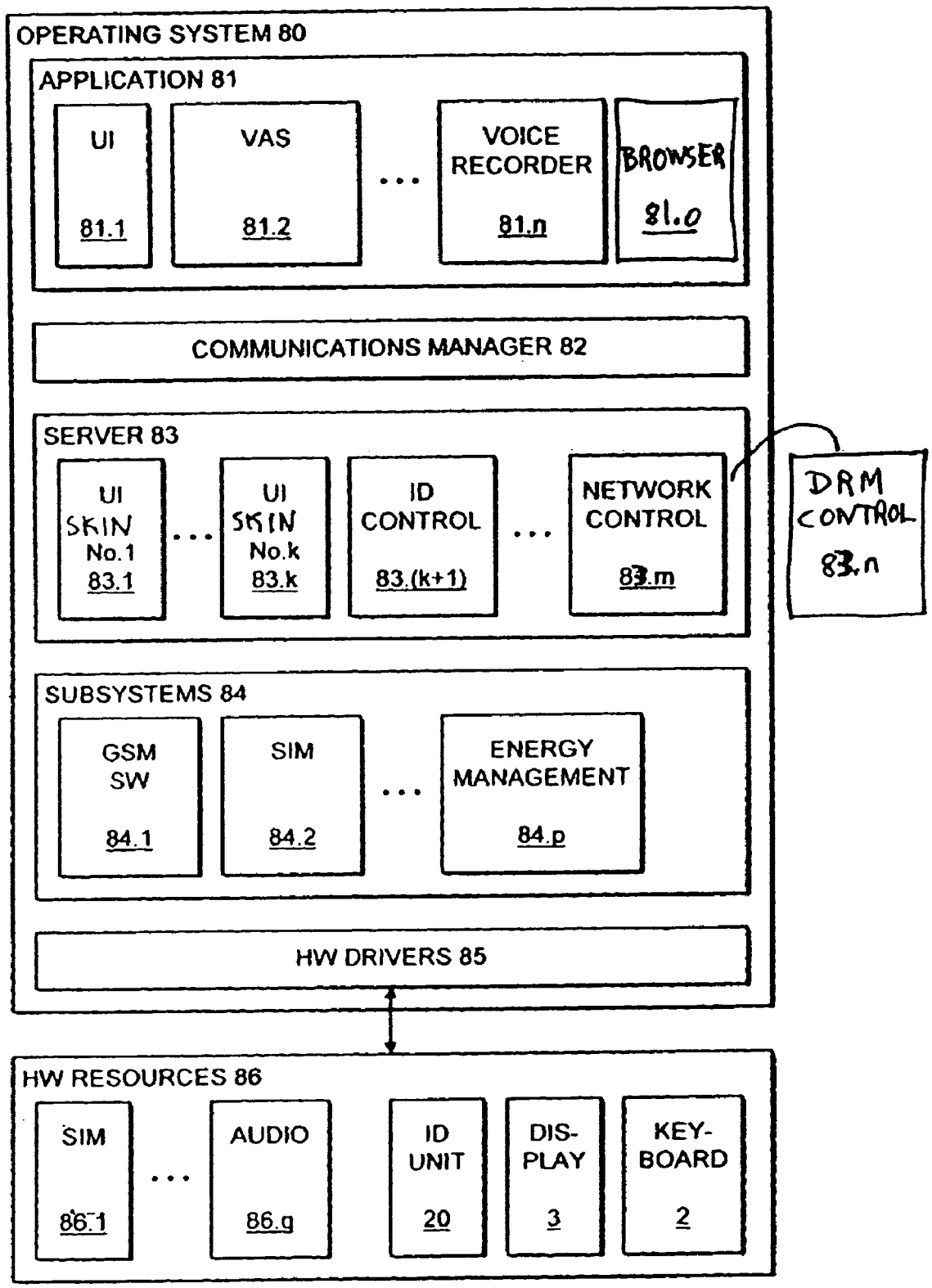
FIG. 3 is a block diagram illustrating an example of the software architecture of the mobile phone illustrated in FIG. 1, including elements useful in providing skins in a first operating system embodiment.

Mobile phone 10 can have any software architecture, but the example known as Intelligent Software Architecture (ISA) is shown in FIG. 3. Operating system 80 has a communication manager 82 controller by processor unit 18. Communication manager 82 handles the communication between a number of software applications 81 and a number of servers 83. Software applications 81.1 to 81.n and servers 83.1 to 83.m communicate under control of the communication manager 82. Software applications 81.1–81.n use the services from the servers 83 to build features, and to present the features to the user via the user interface panels.

The server 83 controls a resource and provides an interface that allows other entities to access the controlled resource. Each server 83 controls, for example the user interface setting, the audio, etc., but only accesses the resource when requested via communication manager 82. A server may use services provided by one or more other servers as part of its own services, but the server does not present information to the user via the user interface panels.

A subsystem 84 is an autonomous part of the software, with a special service interface to the other subsystems. Subsystems 84 may include a number of subsystems 84.1–84.p, such as GSM software 84.1, SIM software 84.2 and energy management 84.p. The hardware drivers 85 are the interface to the hardware resources shown in FIG. 2.

Operating System Embodiment

As shown in FIG. 3, there may be a plurality of UI skin servers 83.1–83.k. Although one or more of UI skin servers 83.1–83.k may be included when the mobile phone 10 is manufactured, it is preferable that at least the data file(s) associated with a skin can be downloaded from a server in or communicating with a wireless communication network through transmitter/receiver circuit 19 and under control of processor unit 18. Furthermore, the user of mobile phone 10 is preferably also able to arrange for payment of such a downloaded skin data file in a method interacting with and supported by the data skin file downloading server.

One or more of UI skin servers 83.1–83.k may contain a copy-forbidding flag in the skin data to prevent subsequent copying of the associated skin to other devices. Alternatively, copy protection can be provided by a separate digital rights management (DRM) server 83.n. This DRM server 83.n can be implemented for a specific software application, such as a web browser as described later, or it may be implemented as an extension to operation system software 80 with an API to provide communication access to a plurality of different software applications. In the latter operating system embodiment, DRM server 83.n provides DRM support for skin type personalization for all software applications having an API interface to DRM server 83.n. Also, implementation of DRM as an extension in operating system software 80 allows full use of all security mechanisms otherwise provided by operating system software 80. In this way a common skin can be provided for a plurality of software applications, thus resulting in a theme for the user across all applications similar to that presently possible in desktop computer systems.

Browser Embodiment

Although an implementation using operating system software 80 is possible, an implementation in a specific software application, such as web browser 81.0 shown in FIG. 3, can be more self-contained and simple. In such an embodiment, the digital rights management can be included in and specially adapted for the particular software application. This is advantageous for a web browser application which provides for the easy transfer of data back and forth, such as to and from the Internet, which allows for easy distribution of unauthorized copies.

Designed to closely model the World-Wide Web architecture, specifications of, for example, the standard naming model, content typing, content formats, protocols, etc., have been developed for a general-purpose application environment for wireless mobile communication devices having limited CPU speeds, memory battery life, display size, and a wide variety of input devices. WAP is a set of specifications, promulgated by the WAP Forum (www.wapforum.org), which defines the interfaces between mobile communication devices and wired Internet devices.

Figure 4:
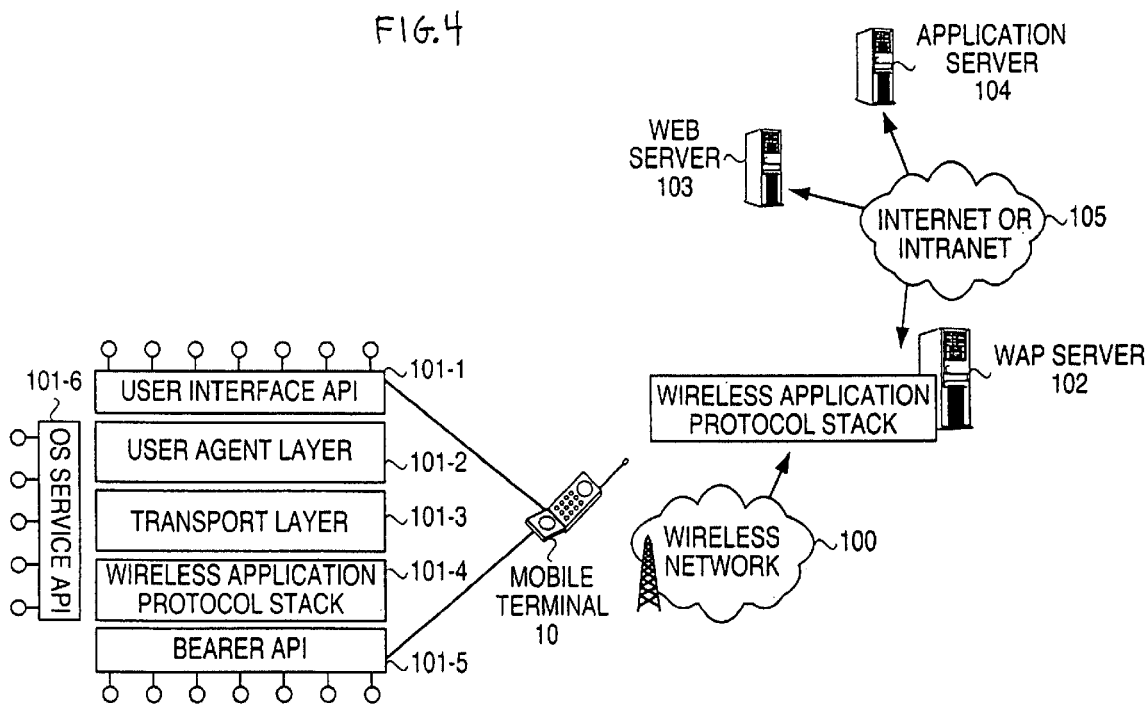
FIG. 4 is a block diagram illustrating the mobile phone in a wireless communication network, and the major elements of an exemplary browser.

FIG. 4 illustrates a browser equipped mobile phone 10 (preferably conforming to the specification provided by the WAP Forum) within a wireless network infrastructure 100. Connections from mobile phone 10 to WAP server 102 are arranged through a bearer service of wireless network 100. The WAP protocol defines a set of bearer services such as Short Message Service (SMS) and High Speed Circuit Switched Data (HSCSD). The WAP content may originate in WAP server 102 or may reside on Web Server 103 or Application Server 104, in which case WAP server 102 functions as a gateway to Web Server 103 and Application Server 104. Connections between WAP Server 102 and Web Server 103 and Application Server 104 are made through the Internet or an intranet 105 or other TCP/IP network, usually with HyperText Transfer Protocol (HTTP) messaging.

The Wireless Application Environment (WAE) model of WAP is based on the WWW client-server model and includes all elements of the WAP architecture related to application specification and execution. It specifies an application framework for wireless mobile communication devices with the goal of enabling network operators, device manufacturers, and content developers to develop differentiating services and applications in a fast and flexible manner. Specifically, the WAE application framework specifies networking schemes, content formats, programming languages, and shared services. Software components 101-1 to 101-5 in mobile phone 10 correspond to elements specified in the WAE application framework. The Operating System (OS) Service Application Programming Interface (API) 101-6 (drawn to the left) of software components 101-1 to 101-5 allows the components to interact with the operating system of mobile phone 10. WAE does not specify any particular user agent, but only specifies the services and formats required to ensure interoperability among the various possible implementations of WAP. Furthermore, it assumes an environment in which one or more user agents providing a specific functionality may operate simultaneously.

The software modules consist of various components corresponding generally to User Agent Layer 101-2, Transport Layer (Loader Layer) 101-3, Wireless Application Protocol Stack 101-4 and OS Service API 101-6 in FIG. 4. The software modules preferably allow mobile phone 10 to browse WML content, XML content, XHTML content and other types of content, execute WMLScript, receive and display Push messages, and receive and display Wireless Bitmap (WBMP) graphics. The browser may support various combinations of markup language standards.

For the second browser embodiment now described, it is preferable that the browser supports at least XML and XSL style sheets. The XML specification is preferable because it separates content and data presentation. The skins are preferably created in XML by using one or more style sheets to adapt the skin to function to display data on LCD 3 of mobile phone 10. Additionally, the skin may be adapted to be best suited for a certain phone or type of mobile communication device (including type of display capabilities, such as size and resolution, as well as certain type of user navigation and control, such as navigation and select keys 15, a touch sensitive display, etc.).

Figure 5:
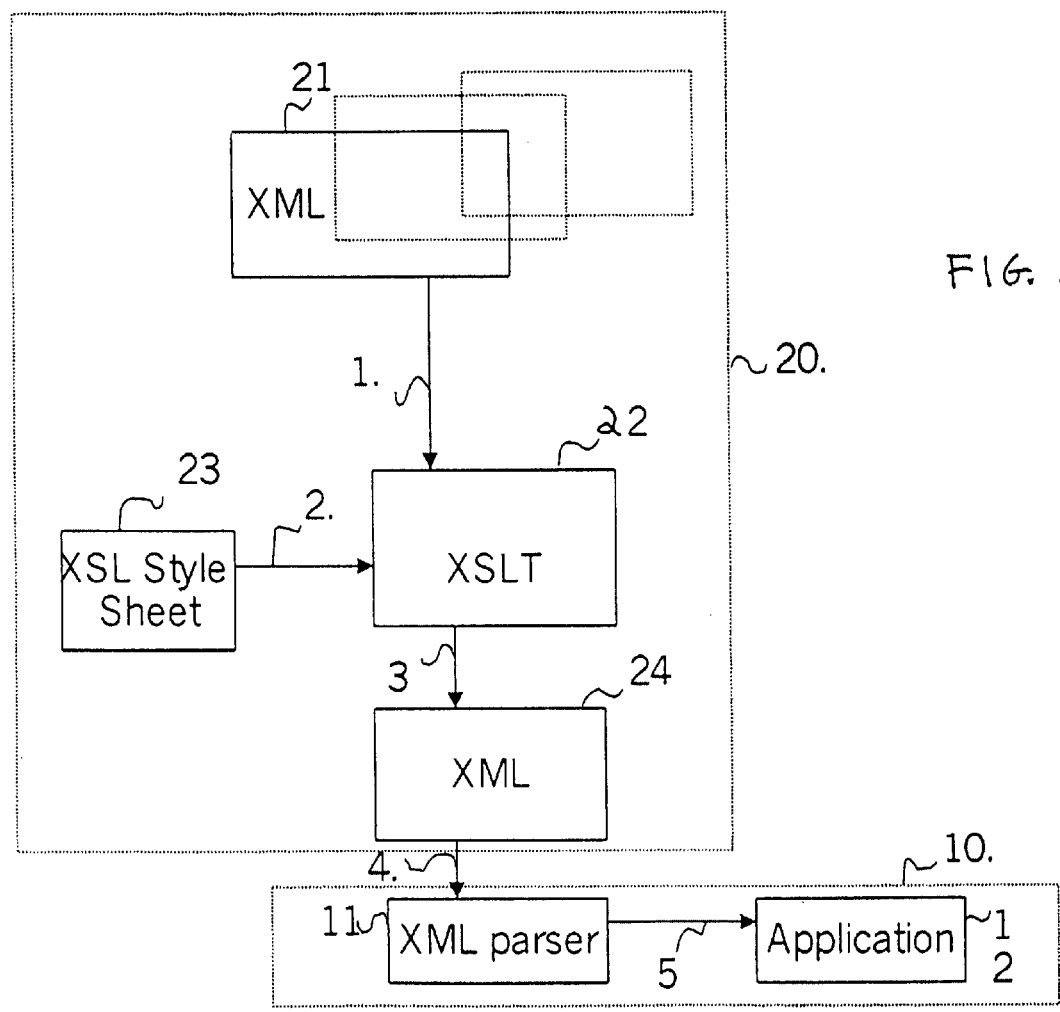
FIG. 5 shows various elements in a server and in a browser equipped mobile phone for providing skins to the mobile phone according to a second browser embodiment.

FIG. 5 illustrates a method of providing a final XSL document representing a skin for a user interface of a mobile communication device from a server 20 or other device on the network side of a wireless communication network communicating with the mobile communication device. The original skin data file is one of a set of XML files 21 available at server 20. When the user of mobile phone 10 contacts server 20, the server 20 can obtain, for example, mobile subscriber information and information indicating the type of mobile phone 10 or mobile communication device to be used in the session (typical information is type of display with pixel resolution, display size, colored or non-colored, etc.). The information may be obtained from the mobile phone or may be part of a user profile maintained at the server. The appropriate XSL style sheet 23 is chosen using the information, and the user selected skin is transformed in a XML Style Language Transformation (XSLT) 22 to, for example, a XML (or WML) skin data file for mobile phone 10. When a user contacts server 20 to obtain a skin, server 20 may utilize the information, particularly the information indicating the type of mobile phone or mobile communication device, to present and offer for user selection only those skins which are most suitable for that type of mobile phone or mobile communication device. For example, a skin may depend greatly on color (which should not be used on phones with black and white displays) or on a display having enough resolution or size for the user interface area or on some animation sections (a blinking eye for example), which may not be supported by all mobile phones. Preferably, server 20 permits the user to view how the skin looks on their particular mobile communication device before purchase thereof. If the user indicates that the skin is satisfactory, the user may initiate a procedure to buy the skin and, as result of the purchase, a download procedure is initiated whereby the skin is downloaded to the mobile communication device.

The XSL style sheet 23 can be located in the mobile phone, but it or other types of style sheets may be located at server 20. If a device dependent style sheet is located in mobile phone 10, then the final XSL transformation 24 is performed by mobile phone 10. At mobile phone 10, the XML parser 11 in browser 81.0 applies the processor of the terminal to translate the XML (or WML) format document of the user interface skin data file in a manner suitable for the user interface application 12. Alternatively, parsing can be performed in server 20 to make the skin ready on the network side to be used by the user interface of mobile phone 10 as soon as the skin is received without any processing.

Instead of transmitting an XML document from server 20 to mobile phone 10, alternative files include, but are not limited to, WML, HTML or metadata. As an example, the metadata may be compatible or backward compatible with the specifications for the Resource Description Framework (RDF) promulgated by the World Wide Web Consortium (W3C). (See http://www.W3.orq/TR/REC-rdf-svntax for model & syntax and http://www.w3.org/TR/CR-rdf-schema-20000327 for schema.) RDF provides for the use of multiple identification and identification references within a single document, the establishment of naming and linking conventions and definitions for the interpretation of attributes. RDF thus makes it possible to provide different metadata for different applications. It enables, for example, classification of a browser's pages. In the context of providing skins to a mobile communication device, the user interface of a software application may have particular obligatory syntax sections for which metadata vocabulary rules can be defined. For example, the skin may have a Uniform Resource Locator (URL) to a site, such as Club Nokia, in certain points therein. This may be used in conjunction with DRM control 83.$n$, where DRM control 83.$n$ does not permit a copy of a skin to be kept when the user obtains a different mobile phone or mobile communication device. For example, a skin created as an RDF document may require that, after contact is made to a URL address and there is payment of usage and/or other DRM rights, the skin is then translated to be ready for a software application and it's the user interface from then on.

An important aspect of the embodiments is to be able to provide DRM protected skins to mobile communication devices. For example, a skin can be sold so that it can be installed on any type of mobile phone or mobile communication device existing at that time or at any time in the future. This has the advantage that the user can become accustomed to their skin and, if the user begins to use another mobile phone or mobile communication device, the user can transfer the skin to the other mobile phone or mobile communication device. Of course, the skin data file is not actually transferred. The server maintains a record of the skin transaction and downloads the skin data file to the other mobile phone or mobile communication device without requiring, for example, additional payment. Alternatively, the skin can be sold with restrictions that the skin can be installed on only one type (or one set of types) of mobile phone or mobile communication device. The pricing of the skin may vary according to the restrictions and maximize revenue to the supplier of the skins.

Furthermore, a mobile phone or mobile communication device may have a passive skin area and an active skin area.

This is possible if the mobile phone or mobile communication device has a large touch sensitive or cell structured display, preferably over almost all its cover area on the front and/or back. The passive skin area is the area where replaceable covers may be exchanged as described in EP 1091540. The active area skin is the user selection area having, for example, a context bar.

In a particular embodiment, a method of providing skins involves offering a plurality of skins which match a respective plurality of exchangeable covers on a mobile phone. For example, there is known from EP 1091540, a method in which each one of a set of exchangeable phone covers have a respective identification unit which identifies the cover when installed on the phone. However, the method involves modifying, for example, the display of functions for softkeys according to the layout of the softkeys on the phone. In this embodiment, the identification of the cover is also use to adapt and/or upgrade the skin for the browser and/or other software applications of the mobile phone. This advantageously improves the user interface in such a way that a new skin is available for the mobile phone at about the same time as a new cover is installed on the phone. The identification unit may either invoke a skin already in the mobile phone or the identification unit may initiate a download procedure from a server as described above. The skin associated with a newly installed cover can be used after the cover is changed to a cover which does not have an associated skin.

While the foregoing has described what are considered to be example embodiments, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. A method of providing a skin from a wireless communication network for a user interface of a mobile communication device for operating using the wireless communication network with the user interface being variable to vary display of data on a display of the mobile communication device, the method comprising:

in the wireless communication network providing a data file including information defining characteristics of the skin for the user interface based upon characteristics of the mobile communication device and providing a markup language style sheet describing a manner in which data is to be displayed on the display of the mobile communication device;

transforming the data file into a markup language document according to the markup language style sheet in dependence upon the characteristics of the mobile communication device; and providing the markup language document to a user interface application to cause the display of the data on the display in accordance with the user interface.

2. The method recited in claim 1, wherein the data file is stored in a server connected to the wireless communication network providing communications to the mobile communication device.

3. The method recited in claim 2, wherein the data file includes a copy protection flag to prevent copying of the skin file.

4. The method recited in claim 2, wherein the markup language style sheet is stored in the server.

5. The method recited in claim 4, wherein the markup language style sheet is selected by the server from among a plurality of markup language style sheets.

6. The method recited in claim 5, wherein the markup language style sheet is selected on the basis of subscriber information and information indicating a type of mobile communication device.

7. The method recited in claim 2, wherein the transformation is performed in the server.

8. The method recited in claim 1, wherein the data file includes information defining display elements of the skin.

9. The method recited in claim 1, wherein the mobile communication device includes a browser, and the browser downloads skin data from the network.

10. The method recited in claim 1, wherein the user interface application is the user interface of a browser, operating system or other user application.

11. The method recited in claim 1, wherein the mobile communication device includes a processor, wherein the processor creates the skin by parsing the markup language document obtained by transforming the data file according to the markup language style sheet.

12. The method of claim 1, wherein at least one skin file is provided for purchase.

13. The method of claim 1, wherein providing the skin file includes arrangement for payment of the skin file.

14. The method of claim 1, wherein the mobile communication device includes a server for digital rights management.

15. The method of claim 14 wherein the server for digital rights management is implemented as an extension to an operating system of the mobile communication device.

16. The method of claim 14 wherein the server for digital rights management provides support for skin type personalization.

17. The method of claim 1, including providing a digital rights management server for digital rights management.

18. The method of claim 1, providing the skin file for at least one of software application.

19. The method of claim 1, wherein the skin file is translated for at least one user interface application.

20. The method of claim 1, wherein the skin file provides a same user interface theme across all software applications.

21. The method of claim 1, wherein the transformation is done by a XML Style Language Transformation (XSLT).

22. The method recited in claim 1 wherein the markup language style sheet is stored in the mobile communications device.

23. The method of claim 1 wherein at least one skin file is provided for a preview before a purchase decision.

24. The method of claim 23 wherein after the purchase decision, a download procedure is initiated for at least one selected skin file.

25. A mobile communication device for operation in a wireless communication network with the wireless communication network providing a data file including information defining characteristics of a skin for a variable user interface of the mobile communication device based upon characteristics of the mobile communication device and providing a markup language style sheet describing a manner in which data is to be displayed on a display of the mobile communication device and the data file is transformed into a markup language document according to the markup language style sheet in dependence upon the characteristics of the mobile communication device comprising:

a transmitter/receiver circuit adapted to send and receive data over a wireless communication network;

operating system software;

a plurality of software applications interacting with said operating system software using a set of software components; and a variable user interface, said user interface including at least the display which is varied by the variable interface, wherein at least one of said plurality of software applications utilizes said user interface, including the display of data on said display; and wherein said mobile communication device is adapted to receive the markup language document through said transmitter/receiver circuit, said markup language document defining a skin for elements of said user interface and wherein said markup language document is provided to at least one of said plurality of software applications to cause the display of the data by the variable user interface.

26. The mobile communication device recited in claim 25, wherein one of said software application comprises a browser or other software application adapted to receive markup language documents and render said documents on said display.

27. The mobile communication device recited in claim 26, wherein said browser is adapted to receive XML documents and render said XML documents on said display.

28. The mobile communication device recited in claim 27, wherein the data defining a skin is an XML document and said browser obtains the skin to be parsed, parses the XML document and the parsed XML document is stored as a skin file in memory of said mobile communication device.

29. The mobile communication device recited in claim 28, wherein said browser uses said skin file to render markup language documents on said screen.

30. The mobile communication device recited in claim 25, wherein said skin file includes a copy protection flag which prevents copying of said skin file.

31. The mobile communication device recited in claim 25, wherein said operating system software is adapted to prepare a skin file from said data defining a skin for elements of said user interface and make said skin file available to said software applications interacting with said operating system software.

32. The mobile communication device recited in claim 31, wherein a plurality of software applications use said skin file made available by said operating system software.

33. The mobile communication device recited in claim 31, wherein the wireless communication network downloads digital rights management information to the wireless communication device which prevents unauthorized copying and the operating system software includes a digital rights management component from the digital rights management information and the use of said skin file is restricted according to said digital rights management component.

34. The mobile communication device recited in claim 25, wherein said mobile communication device is adapted to accept a plurality of exchangeable covers, each of said exchangeable covers having identification units, and to change the skin file to a skin file corresponding to a cover at about a time said cover is installed on said mobile communication device.

35. The mobile communication device of claim 25, wherein the skin is adapted to a user interface of the plurality of software application.

36. The mobile communication device of claim 25, wherein the mobile communication device includes a digital rights management server.

37. The mobile communication device of claim 25, wherein the skin provides a same user interface theme across all software applications.

38. The mobile communication device of claim 25, wherein the data is received via Bluetooth connection.

39. The mobile communication device of claim 25, wherein a parser translates said data defining the skin suitable for the plurality of software applications.

40. The mobile communication device recited in claim 25 wherein the markup language style sheet is stored in the mobile communications device.

41. A server for providing a skin file for a variable user interface of a mobile communication device, the server comprising:

means for receiving a request for the skin for the variable user interface;

means for providing at least one skin data file including information defining characteristics of the skin;

means for transforming the data file with the data file including information defining characteristics of a skin for the variable user interface based upon characteristics of the mobile communication device into a markup language document according to a markup language style sheet; and means for transmitting the markup language document to the mobile communication device for use by a user interface application of the mobile communication device to display data on a display of the mobile communication device in accordance with the variable user interface.

42. The server recited in claim 41 wherein the markup language style sheet is stored in the mobile communications device.

43. The server of claim 41 comprising means for providing at least one markup language style sheet describing a manner in which the at least one skin file is to be represented on a display of the mobile communication device.

44. The server of claim 41 comprising means for obtaining at least one skin file by transforming the at least one skin file into a markup language document according to said at least one markup language style sheet.

45. The server of claim 41 comprising means for interrogating capabilities of the mobile communication device.

46. The server of claim 41 wherein the transforming is performed by XSLT transformation.

47. A wireless communication system comprising:

a mobile communication device, a user interface of the mobile communication device for operating using the wireless communication system with the user interface being variable to vary display of data on a display of the mobile communication device and a user interface application; and wherein the wireless communication system provides a data file including information defining characteristics of a skin for the user interface based upon characteristics of the mobile communication device and providing a markup language style sheet describing a manner in which data is to be displayed on the display of the mobile communication device, transforms the data file into a markup language document according to the markup language style sheet in dependence upon the characteristics of the mobile communication device, and provides the markup language document to the user interface application to cause the display of the data on the display in accordance with the user interface.

48. The system recited in claim 47, comprising a server and wherein the data file is stored in the server connected to the wireless communication system providing communications to the mobile communication device.

49. The system recited in claim 48, wherein the data file includes a copy protection flag to prevent copying of the skin file.

50. The system recited in claim 48, wherein the markup language style sheet is stored in the server.

51. The system recited in claim 50, wherein the markup language style sheet is selected by the server from among a plurality of markup language style sheets.

52. The system recited in claim 51, wherein the markup language style sheet is selected on the basis of subscriber information and information indicating a type of mobile communication device.

53. The system recited in claim 48, wherein the transformation is performed in the server.

54. The system recited in claim 47, wherein the data file includes information defining display elements of the skin.

55. The system recited in claim 47, wherein the mobile communication device includes a browser, and the browser downloads skin data from the network.

56. The system recited in claim 47, wherein the user interface application is the user interface of a browser, operating system or other user application.

57. The system recited in claim 47, wherein the mobile communication device includes a processor, wherein the processor creates the skin by parsing the markup language document obtained by transforming the data file according to the markup language style sheet.

58. A wireless communication system providing a data file including information defining characteristics of a skin for a variable user interface of a mobile communication device within the system based upon characteristics of the mobile communication device within the system and providing a markup language style sheet describing a manner in which data is to be displayed on a display of the mobile communication device and the data file is transformed into a markup language document according to the markup language style sheet in dependence upon the characteristics of the mobile communication device comprising:
  a transmitter/receiver circuit adapted to send and receive data over the wireless communication system;
  operating system software;
  a plurality of software applications interacting with said operating system software using a set of software components; and
  said user interface includes at least the display which is varied by the variable interface, wherein at least one of said plurality of software applications utilizes said user interface, including the display of data on said display; and wherein
  said mobile communication device is adapted to receive the markup language document through said transmitter/receiver circuit, said markup language document defining a skin for elements of said user interface and wherein said markup language document is provided to at least one of said plurality of software applications to cause the display of the data by the variable user interface.

59. The system recited in claim 58, wherein one of said software application comprises a browser or other software application adapted to receive markup language documents and render said documents on said display.

60. The system recited in claim 59, wherein said browser is adapted to receive XML documents and render said XML documents on said display.

61. The system recited in claim 60, wherein the data defining a skin is an XML document and said browser obtains the skin to be parsed, parses the said XML document and the parsed XML document is stored as a skin file in memory of said mobile communication device.

62. The system recited in claim 61, wherein said browser uses said skin file to render markup language documents on said screen.

63. The system recited in claim 58, wherein said skin file includes a copy protection flag which prevents copying of said skin file.

64. The system recited in claim 58, wherein said operating system software is adapted to prepare a skin file from said data defining a skin for elements of said user interface and make said skin file available to said software applications interacting with said operating system software.

65. The system recited in claim 64, wherein a plurality of software applications use said skin file made available by said operating system software.

* * * * *